United States Patent [19]
Hollins

[11] 3,894,809
[45] July 15, 1975

[54] DRILL PRESS ARRANGEMENT
[76] Inventor: Jesse R. Hollins, 40 Stoner Ave., Great Neck, N.Y. 11021
[22] Filed: July 16, 1973
[21] Appl. No.: 379,237

[52] U.S. Cl.................................. 408/128; 74/661
[51] Int. Cl.² ....................................... B23B 47/16
[58] Field of Search ........ 408/128, 1, 133; 82/29 R; 10/136 R, 139 R; 299/59; 74/661; 318/49, 8; 29/64

[56] References Cited
UNITED STATES PATENTS

| | | | |
|---|---|---|---|
| 1,235,132 | 7/1917 | Gaylord et al. | 318/8 |
| 2,154,745 | 4/1939 | Hedgepeth | 408/128 |
| 2,664,756 | 1/1954 | Fismer | 408/128 X |
| 2,836,992 | 6/1958 | Byam | 74/661 |
| 3,165,770 | 1/1965 | Mead | 74/661 X |

Primary Examiner—Gil Weidenfeld

[57] ABSTRACT

A drill press arrangement including a first motor which is double ended. A plurality of stepped pulleys are secured to the first end and second end of said first motor shaft. A plurality of stepped pulleys are secured to the drill spindle and a first belt is trained about a pulley secured to said spindle and a pulley secured to the first end of said first motor shaft. A second motor is provided and a plurality of stepped pulleys are secured to the shaft thereof. A second belt is trained about a pulley secured to said second motor shaft and a pulley secured to the second end of said first motor shaft.

2 Claims, 2 Drawing Figures

DRILL PRESS ARRANGEMENT

BACKGROUND OF THE INVENTION

1. Field of the Invention

Drill press having variable speed drive means

2. Description of the Prior Art

Drill presses are extensively used in machine shops, in homes and in many other places for the purpose of drilling holes in materials such as metal, plastic, etc. Conventional drill presses include an electric motor having a rotating shaft as the output therefor. Stepped pulleys are attached to the motor shaft. A drill chuck is secured to the lower end of a rotating spindle and stepped pulleys are rotatable with the splined end of the spindle which is the upper end of said spindle. A V-belt is looped around a pulley on the motor shaft and a pulley on the spindle. At least some of the pulleys on the motor shaft and spindle are arranged so that a large diameter pulley on the spindle is in registry with a small diameter pulley on the motor shaft and vice versa.

If it is desired to have a low spindle speed, the V-belt is placed in engagement with a small diameter pulley on the motor shaft and a large diameter pulley on the spindle. On the other hand, if it is desired to have a high spindle speed, the V-belt is placed in engagement with a large diameter pulley on the motor shaft and a small diameter pulley on the spindle.

It is a well known fact that for drilling large diameter holes slow drilling speeds are required. The problem of providing variable speeds is more significant for larger drill presses such as one inch drill presses than for smaller drill presses such as half inch drill presses. Many one inch drill presses include a variable speed drive mechanism which is designed so that the spindle can be rotated at very low speeds. One such type of mechanism is known as a back gear which is complicated in construction. A back gear mechanism has to be manually set to disconnect the direct drive of the motor to the spindle in order to establish the back gear drive. On the other hand, in order to re-establish the direct drive physical manipulation of the back gear mechanism is again required.

SUMMARY OF THE INVENTION

1. Purposes of the Invention

It is an object of the present invention to provide an improved means for varying the rotational speed of a spindle on a drill press.

Still another object of the present invention is to provide means for varying the rotational speed of a spindle on a drill press from a relatively low speed to a relatively high speed.

Another object of the present invention is to provide means capable of achieving each of the above and other objects which means is economical in construction and reliable in operation.

Other objects of the invention in part will be obvious and in part will be pointed out hereinafter.

2. Brief Description of the Invention

According to the present invention the foregoing and other objects are achieved by a drill press having a first motor and a second motor. Said first motor is of double end shaft construction and secured to the first end of the output shaft thereof is a plurality of stepped pulleys. The drill press includes a spindle and rotatable therewith is a plurality of stepped pulleys. A first belt is trained about a pulley secured to said first end of said first motor shaft and about a pulley which is rotatable with said spindle.

A plurality of stepped pulleys is attached to the second end of said first motor shaft. Said second motor is single ended and secured to the end of the shaft thereof is a plurality of stepped pulleys. A second belt is trained about a pulley secured to the shaft of said second motor and about a pulley secured to the second end of said first motor shaft.

When it is desired to have the spindle rotate at an intermediate speed, the first motor is energized and the second motor is maintained de-energized. Actuation of the first motor causes the first motor shaft and the pulley attached to the first end thereof to rotate said first belt causing a pulley attached to said spindle to rotate so that said spindle rotates. The second belt causes said second motor shaft to rotate but the second motor is not energized.

If it is desired to have the spindle rotate at extremely slow speeds, the second belt is placed about a small pulley on the second motor shaft and about a large pulley secured to the second end of said first motor shaft. The first belt is placed about a small pulley secured to the first end of said first motor shaft and about a large pulley secured to the spindle. Electrical energy is supplied to the second motor actuating said second motor. The first motor is maintained de-energized. The second belt drives the first motor shaft driving the first belt and rotating the spindle. Of course, if desired, the second motor can be used to drive the spindle at extremely high rates of rotation.

The invention accordingly consists in the features of construction, combination of elements and arrangement of parts which will be exemplified in the drill press arrangements hereinafter described and of which the scope of application will be indicated in the appended claims.

DESCRIPTION OF THE PREFERRED EMBODIMENTS

Figure 1:
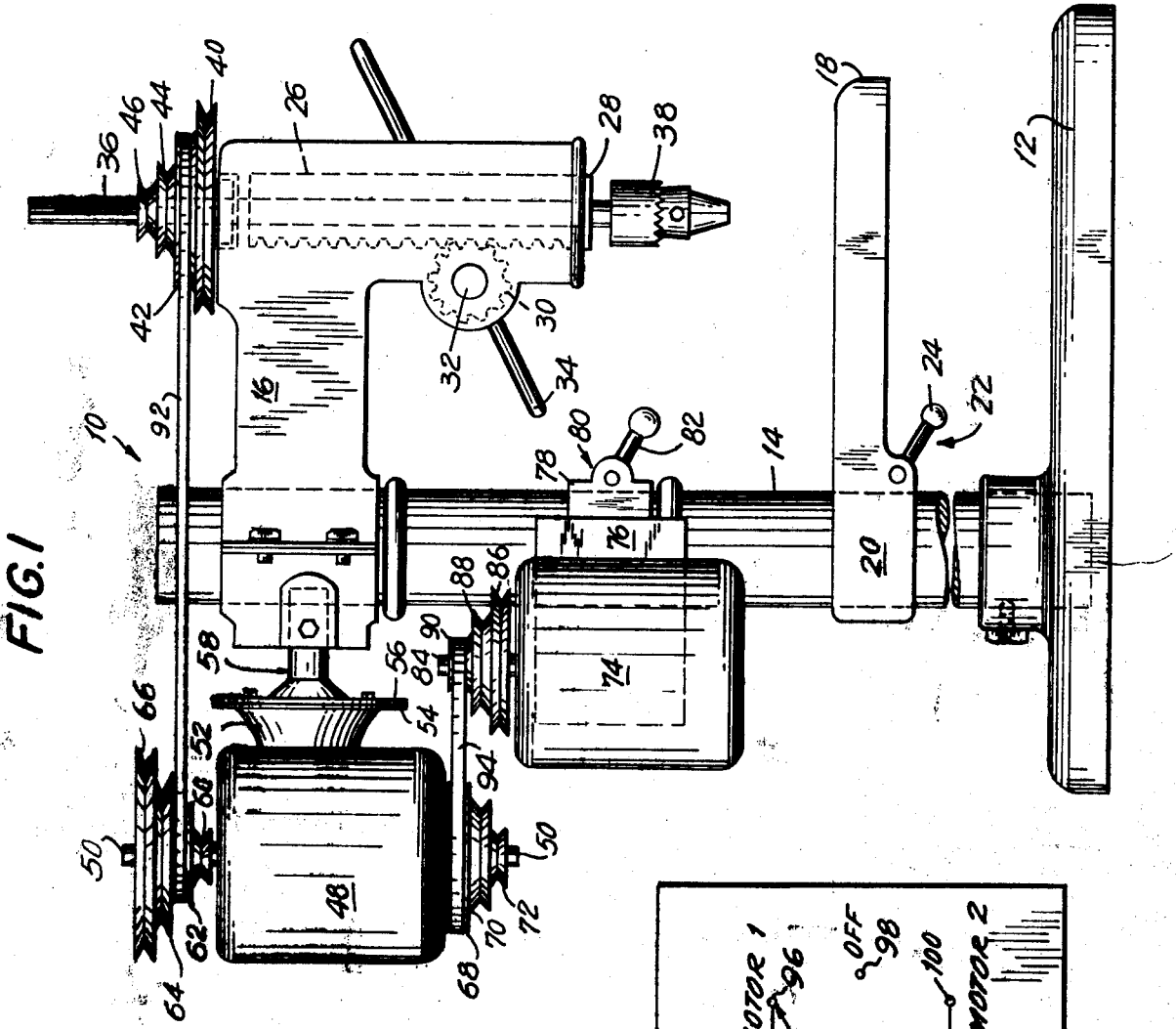
FIG. 1 is a front plan view of a drill press arrangement according to the present invention.

In FIG. 1 of the drawings a drill press arrangement 10 according to the present invention is shown and includes a base 12, a column 14, a drill head housing 16 and a drill table 18. Drill table 18 includes a collar 20 which surrounds column 14 and a clamp 22 is provided for selectively tightening collar 20 about column 14 so that drill table 18 can be placed at different heights relative to base 12. A lever 24 is provided for tightening clamp 22.

Drill head housing 16 includes a collar which is secured about the upper portion of column 14. Located in the vertical portion of drill head housing 16 is a sleeve 26 which is the guide for the spindle assembly. Movable in sleeve 26 is a combined spindle tube and rack 28 and a pinion 30 is in engagement with the teeth thereof. Pinion 30 is fixed to shaft 32 and a lever 34 is provided for rotating said shaft and pinion so as to control the vertical position of combined spindle tube and rack 28.

Combined spindle tube and rack 28 includes a hollow cylindrical interior. A spindle 36 is provided and a portion thereof is located in the interior of combined spindle tube and rack 28. Means is provided for ensuring that spindle 36 moves vertically with combined spindle tube and rack 28 while being able to rotate relative thereto. A drill chuck 38 is secured to the bottom portion of spindle 36 and is rotatable therewith. Spline attached and rotatable with spindle shaft 36 are a plurality of stepped pulleys 40, 42, 44 and 46. Pulleys 40, 42, 44 and 46 continuously decrease in diameter. Pulleys 40 through 46 and spindle 38 rotate in unison but said spindle can move axially relative to said pulleys. All of the structure just described is conventional and per se does not form a part of the present invention.

A double ended electrical motor 48 is provided and includes a shaft 50. A motor mount 52 is secured to motor 48 and includes a flange 54 which is bolted to flange 56 of a motor support 58. Motor support 58 is secured to the collar of drill head housing 16.

Secured to the upper end of motor shaft 50 are stepped pulleys 60, 62, 64 and 66. Pulleys 60, 62, 64 and 66 continuously increase in diameter. Pulleys 60 and 40, 62 and 42, 64 and 44 and 66 and 46, respectively, are mating pulleys. Secured to the bottom portion of shaft 50 are stepped pulleys 68, 70 and 72. Pulleys 68, 70 and 72 continuously decrease in diameter.

A single ended electrical motor 74 includes a motor bracket 76 which is secured to a collar 78 that surrounds column 14 or is integral therewith. A lever 82 is provided for controlling clamp 80 which can tighten collar 78 about column 14.

Motor 74 includes a shaft 84 and secured to said shaft are stepped pulleys 86, 88 and 90 with said pulleys continuously decreasing in diameter. Pulleys 86 and 72, 88 and 70 and 90 and 68 are, respectively, mating pulleys.

A belt 92 is provided and is normally trained about a pulley secured to the upper end of shaft 50 and the mating pulley rotatable with spindle 36. A second belt 94 is trained about a pulley secured to the lower portion of shaft 50 and a mating pulley which is secured to shaft 84.

Figure 2:
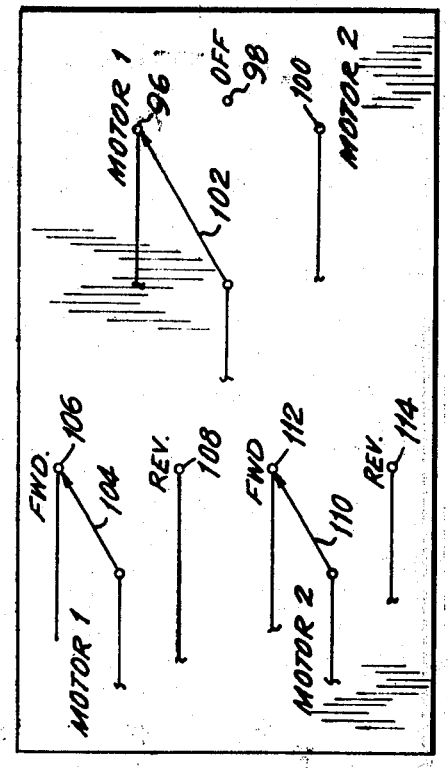
FIG. 2 is a schematic illustration of the switching means for controlling the two motors illustrated in FIG. 1.

In FIG. 2 the switch control means for motors 48 (motor 1) and 74 (motor 2) is illustrated. It is to be appreciated that the switch control means is schematically shown as the circuit therefor is conventional and does not form a part of the present invention. Motor terminals 96 and 100 are provided and between said motor terminals is an "off" terminal 98. A motor control blade 102 is provided and when in contact with terminal 96 electrical energy is supplied only to motor 48. When motor control blade 102 is placed in contact with terminal 98 there is no electrical energy supplied to either of the motors while when motor control blade 102 is in contact with terminal 100 electrical energy is supplied only to motor 74. A motor direction control blade 104 is provided and controls the direction of rotation of motor 48. When motor direction control blade 104 is in contact with terminal 106 and if motor 48 is supplied with electrical energy, said motor is rotated in a forward direction, that is to say, in a direction such that spindle 36 rotates in a direction to enable a drill bit carried by drill chuck 38 to drill a hole in a piece of material. If motor 48 is supplied with electrical energy and motor direction control blade 104 is in contact with terminal 108, motor 48 rotates in the reverse direction from that previously described. A motor direction control blade 110 is provided for motor 74 and when placed in contact with terminal 112 causes motor 74 to rotate in the forward direction if electrical energy is supplied thereto (the forward direction for motor 74 is the same as the forward direction for motor 48). On the other hand, if motor direction control blade 110 is placed in contact with terminal 114 motor 74 rotates in the reverse direction upon receiving electrical energy.

In use, a drill bit is secured in the conventional manner in drill chuck 38. If it is desired to rotate spindle 36 at an intermediate speed for drilling operations, motor control blade 102 is placed in contact with terminal 96. When this occurs no electrical energy is supplied to motor 74. Motor direction control blade 104 is placed in contact with terminal 106. As a consequence thereof, shaft 50 rotates in a forward direction and via belt 92 causes spindle 36 to rotate in a forward direction. Belt 94, which is trained about a pulley secured to the lower end of shaft 50 and to a pulley secured to shaft 84, causes shaft 84 to rotate. Rotation of lever 34 causes shaft 32 to rotate so that pinion 30 lowers combined spindle tube and rack 28 and spindle 36. As a result, the drill bit which is secured by drill chuck 38 drills through the material which is located on table 18. When it is desired to elevate the drill chuck after the drilling operation has been completed, lever 34 is rotated so that shaft 32 rotates pinion 30 to elevate combined spindle tube and rack 28 and spindle 36.

When it is desired to rotate spindle 36 at an extremely low R.P.M., belt 92 is trained about pulley 60 and pulley 40. In addition, belt 94 is trained about pulley 68 and pulley 90. Motor direction control blade 110 is placed in contact with terminal 112. When it is desired to commence drilling operations, motor control blade 102 is moved from terminal 98 to terminal 100 so that electrical energy is supplied to motor 74 which is rotated in the forward direction. As a result of pulley 90 having a smaller diameter than pulley 68 and pulley 60 having a smaller diameter than pulley 40, spindle 36 rotates at an extremely low rotational speed. It is to be appreciated that shaft 50 acts as a jack shaft. Lever 34 is rotated to lower drill chuck 38 so that drilling can take place. After the drilling has taken place, drill chuck 38 is elevated. Motor control blade 102 is then moved from being in contact with terminal 100 to contact terminal 98.

If it is desired to rotate spindle 36 at a high rotational speed, belt 94 is trained about pulleys 86 and 72 and belt 92 is trained about pulleys 66 and 46. The operation of the drill press is as before described.

From the foregoing it is apparent that a drill press is provided which has a wide range of speeds. The double motor arrangement illustrated and described herein is suitable as a drive means on any size drill press, milling machine, lathe, jig boring machine and on other types of machinery.

An advantage of using the double motor arrangement of the present invention is that the arrangement is simple, economical, provides a great range of speeds and is easy to operate.

The drill press arrangement of the present invention is particularly suited for tapping. As will be apparent to those skilled in the art, tapping is normally conducted with spindle 36 rotating at a relatively low speed and the retraction of the tapping tool is done at a higher reverse direction rotational speed of spindle 36. To obtain a low spindle speed for tapping, belt 94 can be trained about pulleys 90 and 68 and belt 92 trained about a pulley on the upper end of shaft 50 and a pulley on spindle 36 that has approximately the same diameter. During tapping, motor 74 will be supplied with electrical energy so that the tapping can be done at a low rotational speed of spindle 36. During retraction of the tapping tool which occurs at a higher reverse direction rotational speed of spindle 36, motor 48 can be supplied with electrical energy and operated in the reverse direction.

If desired, clutch and brake means may be provided for controlling the rotation of the shaft of motor 74 when motor 48 is energized.

It thus will be seen that there is provided a drill press arrangement which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

I claim:

1. A drill press arrangement comprising a spindle for driving a tool, a plurality of stepped pulleys secured to said drill press spindle, a first motor, said first motor being a double-ended motor and having a drive shaft, said first motor drive shaft including a first end and a second end, a plurality of stepped pulleys being secured to said first end, a first belt trained about one of said plurality of stepped pulleys secured to said first end of said first motor drive shaft and trained about one of said pulleys of said plurality of stepped pulleys secured to said spindle, a plurality of stepped pulleys secured to said second end of said drive shaft of said first motor, a second motor, said second motor including a drive shaft, a plurality of stepped pulleys secured to said drive shaft of said second motor, a second belt trained about one of said plurality of stepped pulleys secured to said drive shaft of said second motor and trained about one of said plurality of stepped pulleys secured to said drive shaft of said second motor.

2. A drill press arrangement according to claim 1 wherein switch means is provided for controlling the operation of said first and second motors.

* * * * *